Sept. 18, 1923.

E. N. CUMMINGS

THROTTLE OPERATING DEVICE

Filed June 26, 1922

1,468,378

Inventor:
Edward N. Cummings
Emery, Booth, Janney & Varney
Attys.

Patented Sept. 18, 1923.

1,468,378

UNITED STATES PATENT OFFICE.

EDWARD N. CUMMINGS, OF AMESBURY, MASSACHUSETTS.

THROTTLE-OPERATING DEVICE.

Application filed June 26, 1922. Serial No. 570,838.

*To all whom it may concern:*

Be it known that I, EDWARD N. CUMMINGS, a citizen of the United States, and a resident of Amesbury, county of Essex, and State of Massachusetts, have invented an Improvement in Throttle-Operating Devices, of which the following description, in connection with the accompanying drawings, is a specification, like characters on the drawings representing like parts.

This invention relates to throttle operating devices designed particularly for use on motor vehicles and the object is to provide a device for operation by the foot which will permit the throttle to be held in desired position of adjustment with a steady, uniform pressure in spite of any jouncing of the vehicle in the course of operation and without muscular tension or fatigue.

My invention will be best understood by reference to the following description of the illustrative embodiment thereof shown in the accompanying drawing wherein I have shown an arrangement adapted for application to an automobile accelerator pedal of known type and wherein.

Figure 1:
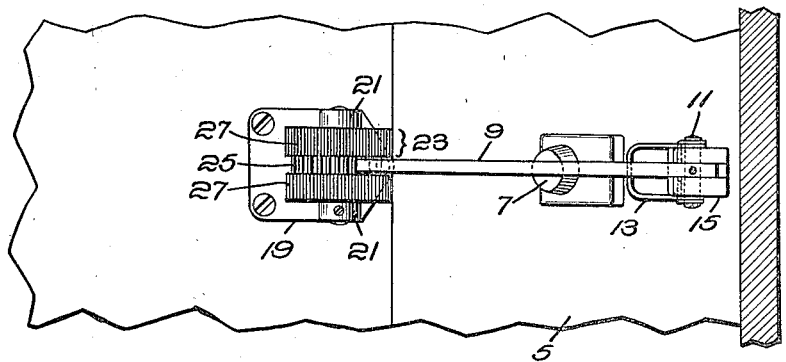
Fig. 1 is a plan view of the device.

Referring to the drawings I have therein shown a portion of the footwell of an automobile, through the footboard 5 of which projects the depressible pedal or button 7 of well known type adapted to operate the throttle of the engine. It is a matter of considerable difficulty in devices of this kind to maintain the throttle in a desired position of adjustment as the jouncing of the vehicle over the road causes the pedal 7 to be unduly depressed or released and even when this is obviated it is at the expense of muscular tension which gives rise to considerable fatigue. In accordance with my invention I provide means for operating the throttle and in particular in the example shown a mechanism which may be utilized for operating on the conventional pedal 7 and which will permit the foot to rest with a steady pressure and wherein the adjustment of the throttle will not be effected by the jouncing of the vehicle on the road.

In the embodiment of the invention shown the actuating motion of the foot is applied to the pedal 7 by means of a lever 9 pivoted at 11 in advance of the pedal 7 and normally elevated as by means of the spring 13 to a limit of movement provided by the stop 15 on the lever which makes contact with the pivotal mounting therefor. Herein this pivotal mounting is shown as provided by ears on a suitable plate 17 adapted to be secured by screws to the footboard of the vehicle.

Figure 2:
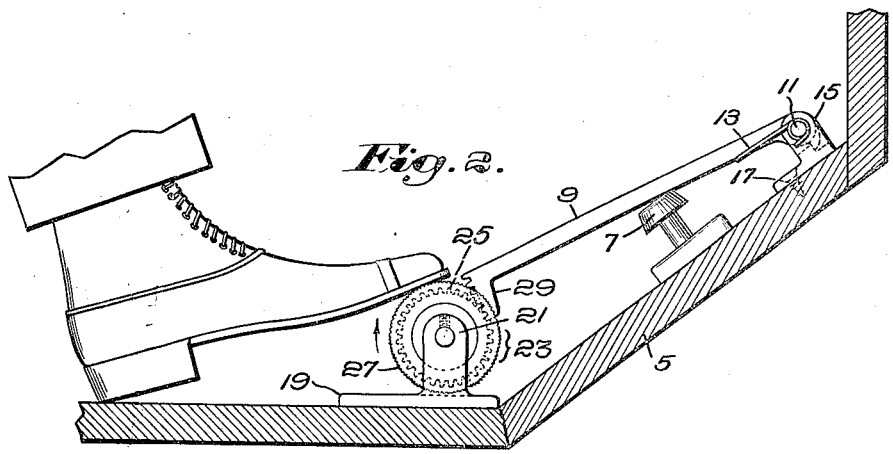
Fig. 2 is a side elevation thereof.
Figure 3:
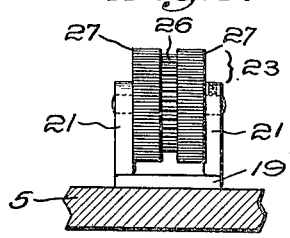
Fig. 3 is an end elevation of a portion thereof.

The primary operating means for the throttle is organized in such a manner that a steady pressure of the foot may be maintained thereon without operating movement and herein I have shown a plate 19 secured to the floor and having ears 21 in which is journalled a wheel 23, the arrangement being such in the example shown that the sole of the foot may rest on the periphery of the wheel while the heel is supported on the surface which carries the plate 19. It will readily be understood from an inspection of Fig. 2 that whatever the rotative position of adjustment of the wheel the foot will always find a bearing in dead center alignment with the pivot of the wheel and thus the downward pressure on the foot does not tend to rotate the wheel 23. If, however, the foot is pressed forward longitudinally the wheel will rotate and a suitable eccentric connection thereof with the throttle operating mechanism may provide for opening and closing the throttle. As already stated in the example shown, movement of the pedal 7 is effected by means of a pivoted lever 9 and herein the wheel 23 embodies a pinion 25, preferably formed as a central portion thereof between the elevated roughened treads 27, and the end of the lever 9 is formed as a sector gear 29 meshing with this pinion. The action of the spring 13 on the lever 9 will normally bring the parts to the position shown in Fig. 2 and it will be readily understood that if the foot is slid forward on the heel, rotating the wheel 23 in a clockwise direction, the lever 9 will be swung in a counterclockwise direction, depressing the pedal 7. The throttle having been opened in this manner, the weight of the foot may rest firmly against the wheel 23 without the introduction of any new forces tending to rotate the same but on the contrary serving to hold it in its position of adjustment. The operator thus finds a firm support for his foot and any jouncing of the vehicle does not cause him to release the pedal 7 or to increase the pressure thereon.

It will be understood that the arrangement of pinion and sector gear is but one example of a suitable transmission mechanism whereby the rotative movement of the wheel may be transmitted to the pedal 7 and also that other devices than a rotary wheel may be provided within the scope of my invention for providing a support for the foot substantially immovable under downward pressure but adapted to move under lengthwise shifting of the foot in such manner as to transmit motion to operate a depressible pedal 7 or similar mechanism for controlling the throttle of the engine.

Having described in detail the particular example of my invention shown in the accompanying drawings, the novel features exemplified thereby which I wish to secure by Letters Patent I shall define in the following claims.

Claims:

1. In combination with a depressible throttle operating device, a lever overlying the same, a sector gear on the lever, a pinion meshing therewith and presenting a tread whereby it may be rotated by the foot.

2. In combination with a reciprocable throttle operating device a wheel mounted to receive the fore part of an operator's foot with the heel on the surface which supports the wheel, a pivoted lever overlying said device and means connecting the free end of the lever with the wheel eccentrically thereof to receive motion therefrom as the wheel is rotated.

3. In combination with a depressible throttle-operating device which projects above the footboard of a motor vehicle, an attachment for working the same adapted to be superposed on said footboard and comprising a tread to receive the sole of the foot substantially immovable under downward pressure thereof but adapted to move under lengthwise shifting of the foot and associated motion transmitting means to effect depression of said device on such movement.

4. An attachment for application to the footboard of existing motor vehicles to overlie the depressible throttle-operating device projecting therethrough and embodying securing portions for superposition on said footboard, a rotary member journalled to lie above said board and presenting a tread on which the foot may rest and a cooperating mechanism for depressing said device eccentrically connected to said rotary member to be actuated thereby.

5. An attachment for application to the footboard of a motor vehicle comprising a base to rest on the top thereof, a rotary member journalled therein to lie above the board and presenting a tread on which the foot may rest and connecting means eccentrically related thereto to depress a throttle-operating device which projects through said footboard.

In testimony whereof, I have signed my name to this specification.

EDWARD N. CUMMINGS.